US008459089B2

(12) United States Patent
Bruntink

(10) Patent No.: US 8,459,089 B2
(45) Date of Patent: Jun. 11, 2013

(54) DRIVING MEANS AND DEVICE FOR WORKING SHEET-LIKE MATERIAL

(75) Inventor: Ronald Bruntink, Winterswijk (NL)

(73) Assignee: Nivora IP B.V., Lochem (NL)

( * ) Notice: Subject to any disclaimer, the term of this patent is extended or adjusted under 35 U.S.C. 154(b) by 190 days.

(21) Appl. No.: 13/002,581

(22) PCT Filed: Jun. 23, 2009

(86) PCT No.: PCT/EP2009/057758
§ 371 (c)(1),
(2), (4) Date: Mar. 28, 2011

(87) PCT Pub. No.: WO2010/003810
PCT Pub. Date: Jan. 14, 2010

(65) Prior Publication Data

US 2011/0239728 A1 Oct. 6, 2011

(30) Foreign Application Priority Data

Jul. 7, 2008 (EP) .................................... 08075607

(51) Int. Cl.
*B30B 5/00* (2006.01)
*F16H 19/06* (2006.01)

(52) U.S. Cl.
USPC ............. 72/389.3; 72/429; 100/267; 100/278

(58) Field of Classification Search
USPC ........... 72/389.3, 389.4, 389.5, 429; 100/231, 100/267, 278
See application file for complete search history.

(56) References Cited

U.S. PATENT DOCUMENTS

| | | | | |
|---|---|---|---|---|
| 2,546,683 | A | 3/1951 | Young | |
| 4,608,922 | A * | 9/1986 | Pohl | 100/264 |
| 4,721,286 | A | 1/1988 | Hey et al. | |
| 5,012,729 | A * | 5/1991 | Slot | 100/278 |
| 6,926,259 | B1 | 8/2005 | Roodenburg et al. | |

FOREIGN PATENT DOCUMENTS

| | | | |
|---|---|---|---|
| EP | 0293944 | A2 | 12/1988 |
| EP | 0384529 | A1 | 8/1990 |
| FR | 983771 | | 3/1949 |
| GB | 10243 | | 0/1910 |
| GB | 1473382 | | 5/1977 |
| NL | 1023585 | C2 | 12/2004 |
| SU | 618300 | A1 | 7/1976 |
| WO | 9214028 | A2 | 8/1992 |

* cited by examiner

*Primary Examiner* — David B Jones
(74) *Attorney, Agent, or Firm* — The Webb Law Firm

(57) ABSTRACT

The invention relates to driving means for displacing two elongate members, the driving means comprising: a first set of at least a row of primary rollers and a row of secondary rollers; a second set of at least a row of primary rollers and a row of secondary rollers; wherein the first set is connected to a first member and the second set is connected to a second member; and wherein a belt serpentines between the primary rollers of the first set and the primary rollers of the second set along the length of the members and serpentines back between the secondary rollers of the first set and the secondary rollers of the second set.

15 Claims, 3 Drawing Sheets

DRIVING MEANS AND DEVICE FOR WORKING SHEET-LIKE MATERIAL

BACKGROUND OF THE INVENTION

1. Field of the Invention

The invention relates to a driving means, which can be used in a device for working sheet-like material, such as a press brake for bending steel sheet.

2. Description of the Prior Art

A driving means for a press brake is known from European patent application No. 0 384 529. The disadvantage of such a driving means is the limitation of the available press force per length of the beams. This limitation is for example the result of the tensile strength of the belt. An increase of the belt width in order to increase the tensile strength would limit the maximum bending angle of the device for certain products when bending sheet-like material. By increasing the belt width, the width of the beams is increased, which in turn results in a higher chance on collisions between the sheet-like material and the beams.

Another limitation is related to the electric motors used for driving the belt. If the pressure force of the device would be increased the power of the electric motors should also be increased resulting in larger motors having slower dynamics which has an impact on the speed with which the device can be operated.

Yet another limitation of the driving means according to the prior art, is the limited number of rollers in respect to the length of the driving means. Reducing the diameter of the rollers, to increase the number of rollers, would only partially increase the press force. When the diameter of the rollers is reduced, the belt has a smaller bending radius, which reduces the maximum tensile strength of the belt.

SUMMARY OF THE INVENTION

It is now an object of the invention to provide a driving means with which the pressure force can be increased per length of the device without having the above-mentioned disadvantages, or at least a reduction of the disadvantages, which would result with the prior art.

This object of the invention is achieved by a driving means for displacing two elongate members, the driving means comprising:

- a first set of at least a row of primary rollers and a row of secondary rollers;
- a second set of at least a row of primary rollers and a row of secondary rollers;

wherein the first set is connected to a first member and the second set is connected to a second member; and wherein a belt serpentines between the primary rollers of the first set and the primary rollers of the second set along the length of the members and serpentines back between the secondary rollers of the first set and the secondary rollers of the second set.

By using two sets of at least two rows of rollers, the pressure force is increased, while the tensile force of the belt can remain constant. By maintaining the tensile force in the belt constant and by having a double set of rollers, the length of the belt which has to be taken up or fed in order to move the members is increased.

So with a driving means according to the invention the width of the belt can remain constant in view of the prior art, while the pressure force of the driving means is increased per length of the elongate members. It would also be possible with the driving means according to the invention to decrease the width of the belt, while keeping the maximum pressure force constant in view of the prior art devices. By decreasing the width of the belt the tensile force of the belt is reduced, but the pressure force is in turn increased with the arrangement according to the invention. So, it is possible to have a driving means having a similar pressure force as with the prior art, but with which the width of the members on which the rollers are arranged is decreased. In case of a press brake this would result in sharper bending angles for certain products and the chance on collisions is reduced.

Another advantage of such driving means is that they enable a modular design. Depending of the amount of force required a number of driving means according to the invention can be used in parallel. These driving means can accordingly be coupled by an electronic control system.

In a preferred embodiment of the driving means according to the invention, the first row and second row of the first and/or second set are substantially parallel.

In an embodiment of the driving means according to the invention one end of the belt is fixed to a member and the other end is wound on a drivable spool.

In another embodiment the belt is fixed to the respective member at the roller at which the belt changes direction to serpentine back along the length of the member. In this embodiment it is necessary that both ends of the belt are wound such, that the tension in both belt ends remain substantially constant.

In a preferred embodiment of the driving means according to the invention each end of the belt is wound on a respective drivable spool. This has the advantage that the belt can be wound up onto a spool at twice the speed as both ends will be wound up, but it is also possible to design the motors for each spool for particular use. When used in for example a press brake, it would be possible to have one spool to drive the rapid traverse of the device, while the other motor is designed for the press stroke. This latter motor will have a reduction box suitable to develop a high force, but at a low speed while the motor for the rapid traverse develops less force but a high speed. So, by using two different motors to drive the belt, it is possible to have one motor optimized for high speeds and low forces, while the other motor could be optimized for high forces and low speeds.

When in an embodiment only one of the motors is used to drive the device, the other motor should be able to keep the respective end of the belt at a fixed position. This can be done, by powering the other motor to provide a sufficient counter force, but is advantageous to provide a separate breaking mechanism, which locks the motor and ensures, that the end of the belt can be maintained at a fixed position, while the other motor is driven.

In yet another embodiment the belt is split at the roller at which the belt changes direction to serpentine back along the length of the member and wherein each end of the two belt parts are either wound on a drivable spool or fixed to the respective member. This provides for a compact construction having two sets of rollers.

The invention further relates to a device for working sheet-like material, such as a press brake for bending steel sheet, which device comprises:

- a frame;
- two, relative to each other movable, substantially parallel beams for working the sheet-like material, which beams are connected to the frame;
- driving means according to the invention, for driving the substantially parallel beams away or towards each other.

In an embodiment of the device according to the invention, the first member of the driving means is arranged on a movable beam and the second member of the driving means is arranged on the frame.

In yet another embodiment of the device according to the invention the device comprises driving means on opposite sides of the beam and are the rollers of both driving means, at which the belt changes direction to serpentine back along the length of the beam, displaceable and coupled to each other. Preferably the rollers, at which the belt changes direction, are coupled to each other by at least one yoke.

By coupling the driving means on opposite sides, it is possible to have the driving means driven by a single motor or, in case both ends should be wound up onto spools, by two motors, whereas in a non-coupled version two driving means would either require two or four motors. It would even be possible to have both ends of a belt wound up by one motor and thus to have one motor drive two belts in the case the driving means on opposite sides are coupled.

By coupling the rollers, at which the belt changes direction, it is possible to compensate for any difference in belt tension when both belts of the driving means are driven by a single motor. The yoke provides for a simple mechanical solution. Another possibility is to have tension sensors in the belt and to electronically provide for a compensation when two separate motors are driving the two belts of both driving means. Other possibilities for measuring force and/or torque can be considered in order to provide for an electronic compensation in belt tension.

In a further preferred embodiment the pitch between the rollers of a row vary in order to compensate for any deviations in the desired force profile along the length of the beams. By varying the pitch between the rollers it is possible to vary the force applied to the beams. This enables for example an active compensation of curving of the beams or an even better spreading of the generated force over the length of the beams.

In yet another preferred embodiment of the device according to the invention the beams comprise a tool receiving structure for receiving and holding tools, such as press brake tools.

Instead of a belt, also a chain, rope, or wire can be used in the invention. When a chain is used, it can be advantageous to use chain wheels instead of rollers.

BRIEF DESCRIPTION OF THE DRAWINGS

These and other advantages of the invention will be elucidated in conjunction with the accompanying drawings.

BRIEF DESCRIPTION OF THE PREFERRED EMBODIMENTS

Figure 1:
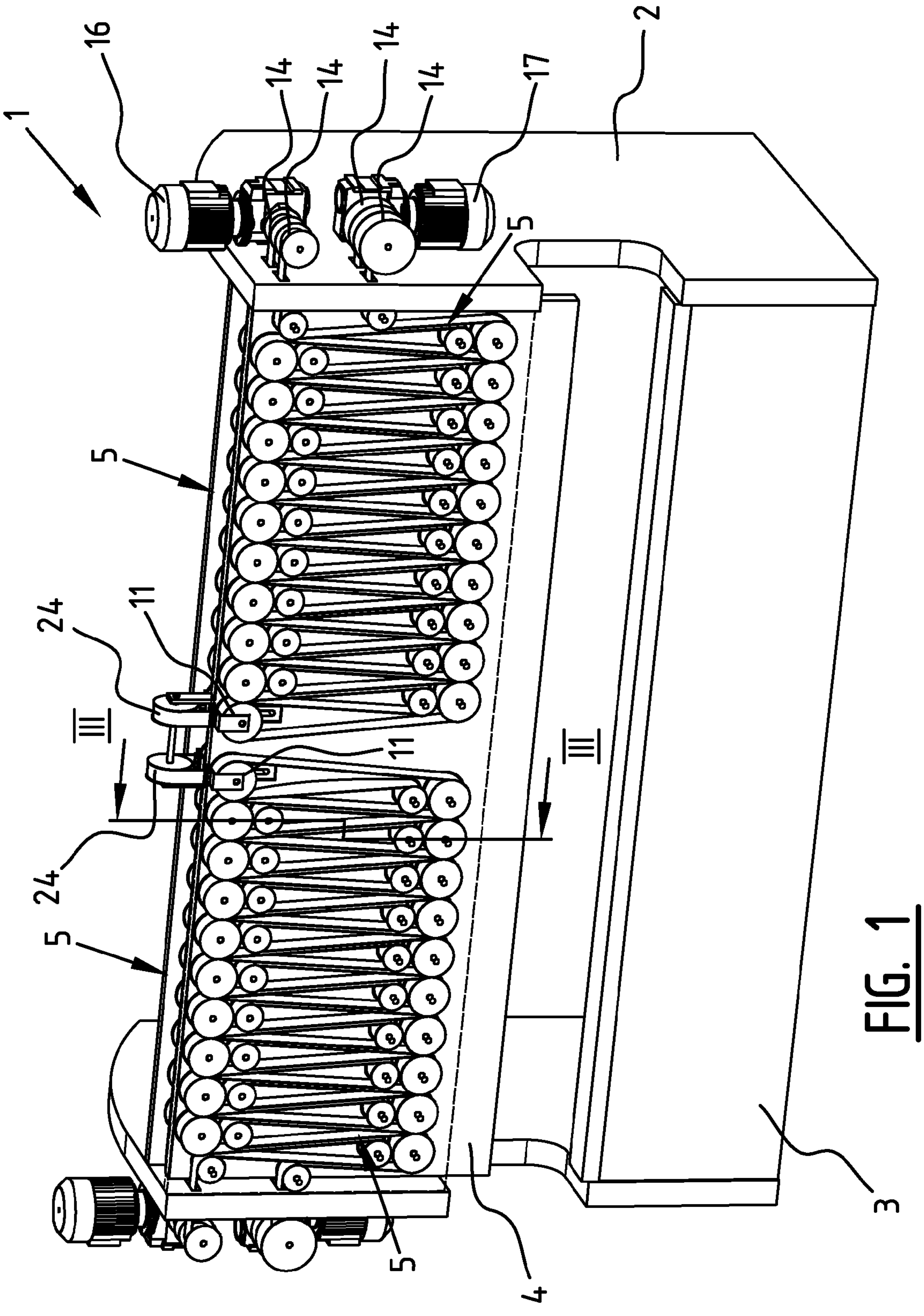
FIG. 1 shows a perspective view of an embodiment according to the invention.
Figure 2:
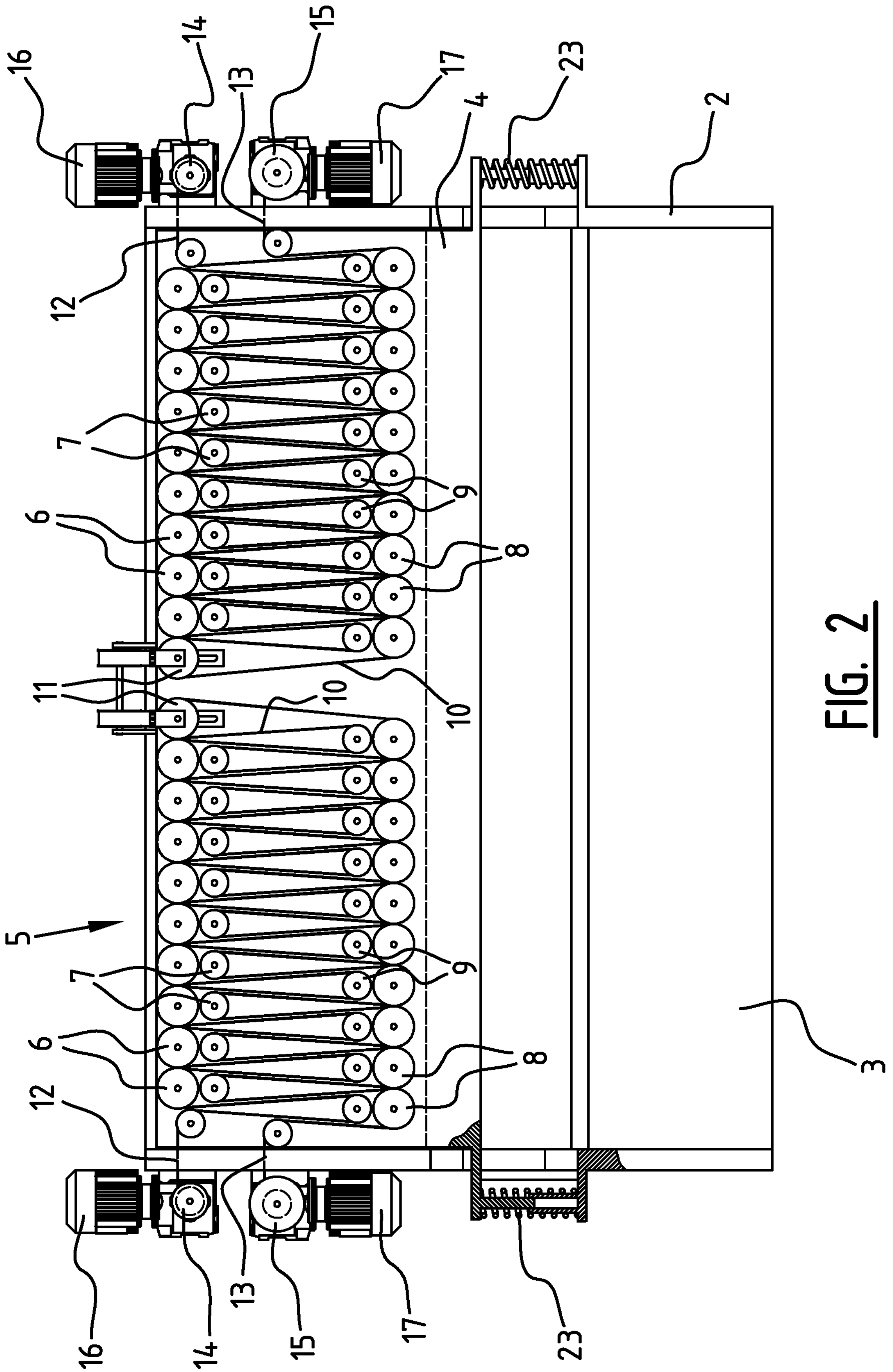
FIG. 2 shows a side-view of the device according to FIG. 1.

In FIG. 1 a perspective view of an embodiment of a device according to the invention 1 is shown. This device 1 has a so-called C-frame 2 with a lower beam 3 fixed to the C-frame 2 and a movable upper beam 4.

Near the upper beam 4 four driving means 5 are arranged. Two driving means 5 are arranged on the front side of the beam 4, while the other two driving means 5 are arranged on the back.

Each driving means 5 has a first set of a row of primary rollers 6 and a row of secondary rollers 7 and a second set with a row of primary rollers 9 and a row of secondary rollers 8.

Each driving means 5 has a belt 10, which serpentines between the primary rollers 6 of the first set and the primary rollers 9 of the second set along the length of the beam 4 and serpentines back between the secondary rollers 7 of the first set and the secondary rollers 8 of the second set. Each driving means 5 has a return roller 11 at which the belt 10 changes direction.

The belt 10 has a first end 12 and a second end 13. Both ends are wound to a respective spool 14, 15. The spools 14, 15 are driven by respective motor 16, 17. These motors 16, 17 can be provided with a gearbox to convert the speed and power range of the motor to another range of speed and power. The spool 15 is used to provide the rapid traverse of the upper beam 4, while the spool 14 is used for the press-stroke of the beam 4.

Figure 3:
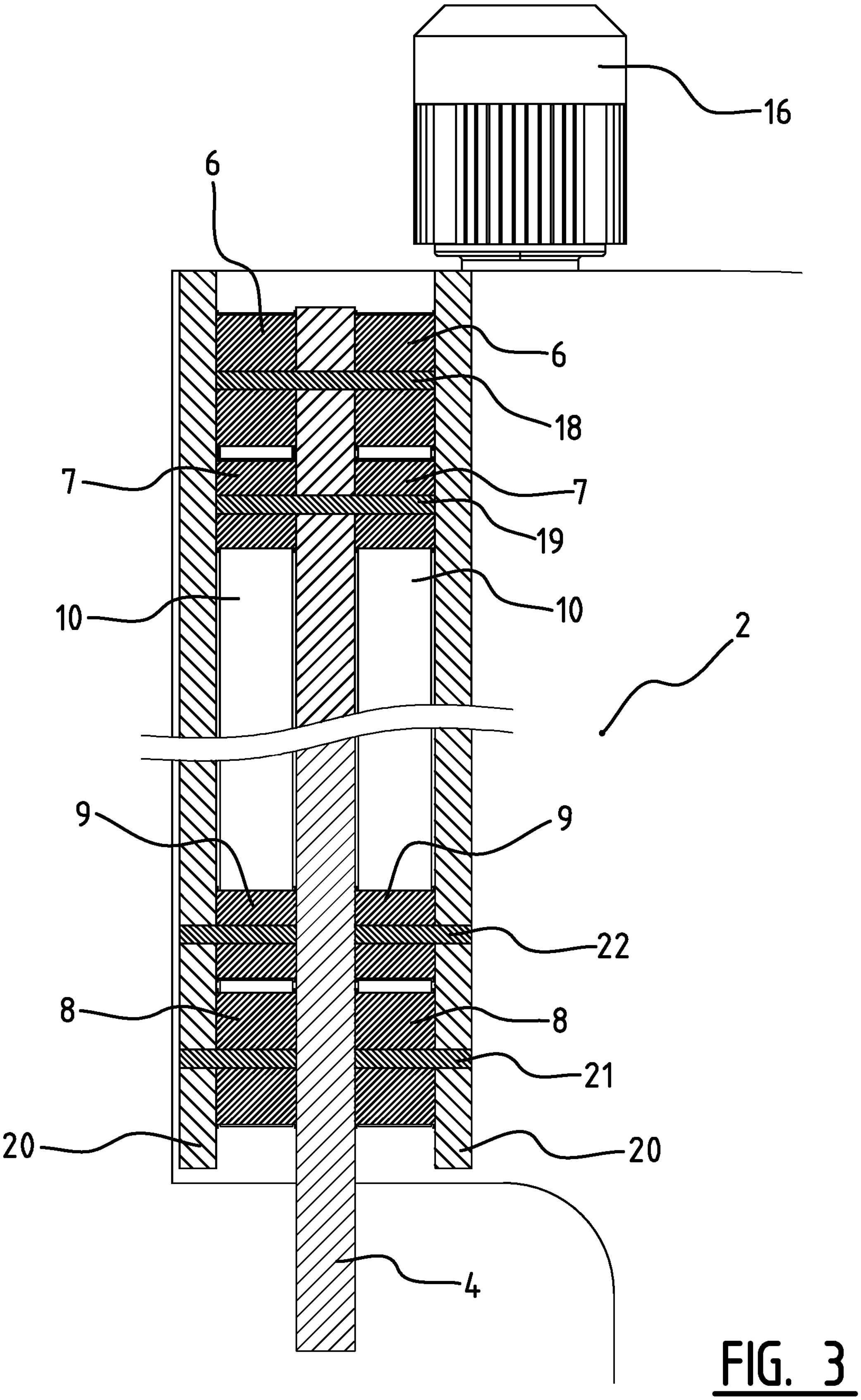
FIG. 3 shows a cross-sectional view along the upper beam of the device according to FIG. 1.

In FIG. 3 it is shown how the rollers 6, 7, 8, 9 are connected to either the upper beam 4 or the lower beam 3. The primary rollers 6 and the secondary rollers 7 are arranged on the upper beam 4 by axles 18 and 19 respectively.

The primary rollers 9 and secondary rollers 8 of the second set are connected to connection plates 20 by axles 21 and 22 respectively. The connection plates 20 are connected to the C-frame 2 which is in turn connected to the fixed lower beam 3.

When the motors 16, 17 drive the spools 14, 15 the belt is wound up onto these spools 14, 15 and the rows of rollers 6, 7 are pulled nearer to the rows of rollers 8, 9. This in turn results in a lowering of the beam 4.

In order to be able to move the beam 4 upwardly again after pressing for example a sheet metal plate, springs 23 are arranged between the lower beam 3 and the upper beam 4. These springs 23 urge the upper beam upwardly as soon as the tension in the belts 10 is released by rewinding the spools 14, 15.

As clear from FIG. 1 the spools 14 of opposite driving means 5 are arranged on the same motor 16. The same applies for the spools 15 which are arranged on the same motor 17. In order to compensate for any tension differences between the belts 10 of the opposite driving means, the return rollers 11 of both driving means 5 are coupled by a yoke 24. This yoke 24 is formed by a roller over which a yoke belt runs.

When for example the tension in the belt 10 on the back side of the upper beam 4 increases the respective return roller 11 will be pulled downwardly and as a consequence the return roller 11 on the front side of the beam 4 will be pulled up. By pulling the return roller 11 at the front side upwardly the tension in the belt at the front side of the beam 4 is increased such that the tension in both belts 10 is in equilibrium.

The figures show an embodiment in which four driving means according to the invention are arranged on the beams of a press brake. Depending on the length of a device and the required force, it is possible to vary the amount of driving means. So, it is possible to have the shown 2×2 configuration, but also a 2×3, 2×4, etc. configuration. It is also possible to have an even number on one side and an uneven number on the other side.

The embodiment shown in the figures has one beam fixed to the frame, while the other beam is movable up and down by the driving means according to the invention. It would also be possible to have both beams movable relative to the frame. In such an embodiment each beam is driven by a separate driving means according to the invention.

The invention claimed is:

1. A driving means for displacing two elongate members, the driving means comprising:

a first set of at least a row of primary rollers radially spaced from one another along the primary roller row and a row of secondary rollers radially spaced from one another along the secondary roller row; and a second set of at least a row of primary rollers radially spaced from one another along the primary roller row and a row of secondary rollers radially spaced from one another along the secondary roller row;

wherein the first set is connected to a first member and the second set is connected to a second member; and wherein a belt serpentines between the primary rollers of the first set and the primary rollers of the second set along the length of the members and serpentines back between the secondary rollers of the first set and the secondary rollers of the second set.

2. The driving means according to claim 1, wherein the first row and second row of the first set are substantially parallel.

3. The driving means according to claim 1, wherein the first row and second row of the second set are substantially parallel.

4. The driving means according to claim 1, wherein one end of the belt is fixed to a member and the other end is wound on a drivable spool.

5. The driving means according to claim 1, wherein the belt is fixed to the respective member at the roller at which the belt changes direction to serpentine back along the length of the member.

6. The driving means according to claim 1, wherein each end of the belt is wound on a respective drivable spool.

7. The driving means according to claim 1, wherein each end of the belt is wound on a single spool.

8. The driving means according to claim 1, further comprising spring means for urging the two members away from each other.

9. The driving means according to claim 1, wherein the belt is split at the roller at which the belt changes direction to serpentine back along the length of the member and wherein each end of the two belt parts are either wound on a drivable spool or fixed to the respective member.

10. A device for working sheet-like material, such as a press brake for bending steel sheet, which device comprises:

a frame;

two, relative to each other movable, substantially parallel beams for working the sheet-like material, which beams are connected to the frame; and driving means according to claim 1 for driving the substantially parallel beams away or towards each other.

11. The device according to claim 10, wherein the first member of the driving means is arranged on a movable beam and the second member of the driving means is arranged on the frame.

12. The device according to claim 10, further comprising driving means on opposite sides of the beam and wherein the rollers of both driving means, at which the belt changes direction to serpentine back along the length of the beam, are displaceable and coupled to each other.

13. The device according to claim 12, wherein the rollers, at which the belt changes direction, are coupled to each other by at least one yoke.

14. The device according to claim 10, wherein the pitch between the rollers of a row vary in order to compensate for any deviations in the desired force profile along the length of the beams.

15. The device according to claim 10, wherein the beams comprise a tool receiving structure for receiving and holding tools, such as press brake tools.

* * * * *

UNITED STATES PATENT AND TRADEMARK OFFICE

CERTIFICATE OF CORRECTION

PATENT NO. : 8,459,089 B2
APPLICATION NO. : 13/002581
DATED : June 11, 2013
INVENTOR(S) : Ronald Bruntink It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 272 days.

Signed and Sealed this
Eighth Day of September, 2015

Michelle K. Lee
*Director of the United States Patent and Trademark Office*